USABLE ☐
BEST ▨

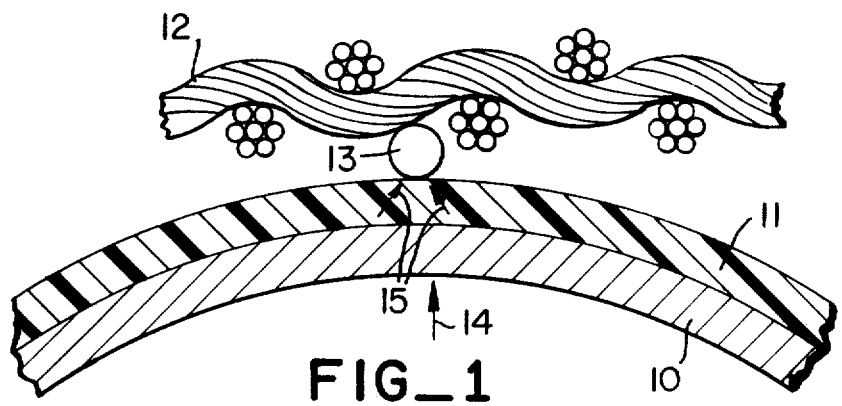
FIG_1
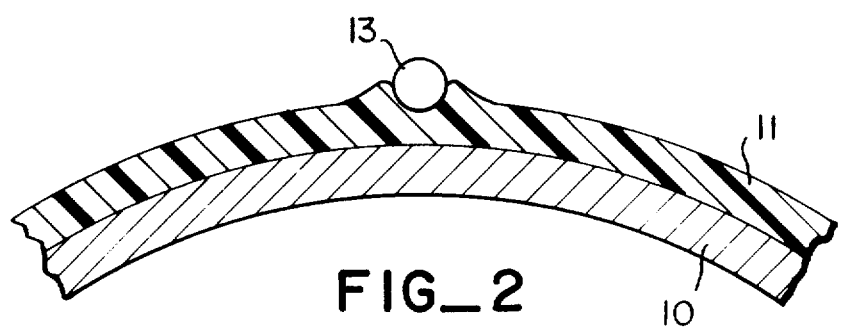
FIG_2
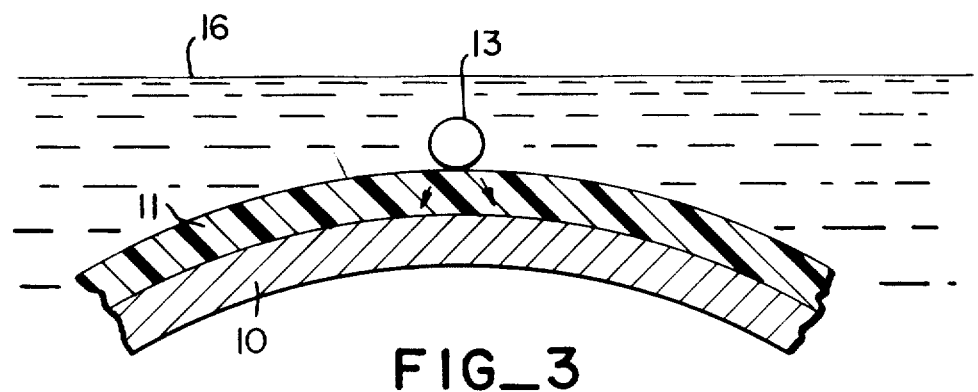
FIG_3
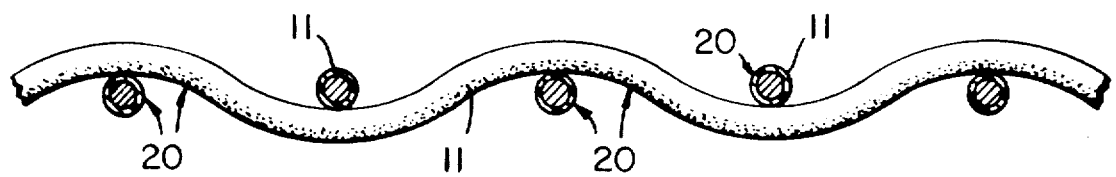
FIG_4
INVENTORS
EDWARD T. STRICKLAND
HOMER C. AMOS

United States Patent Office
3,682,690
Patented Aug. 8, 1972

3,682,690
ARTICLE COATED WITH A WATER-WASHABLE
TACKY ELASTOMER
Homer C. Amos, 1086 Marshall Way, and Edward T. Strickland, 171 Luring Drive, both of Palm Springs, Calif. 92262
Continuation-in-part of application Ser. No. 612,547, Jan. 30, 1967, which is a continuation-in-part of application Ser. No. 488,166, Sept. 17, 1965. This application June 17, 1970, Ser. No. 46,967
Int. Cl. C09j 7/02; A47l 25/08
U.S. Cl. 117—122 P                        6 Claims

ABSTRACT OF THE DISCLOSURE

Upon a base is a film of water-washable tacky elastomer, having a modulus of elasticity (Young's modulus) of about 1 to 100 p.s.i., and an internal viscosity of about 1000 to 20,000 poises or expressed in minutes by another test method, of from 0.1 to 800 minutes. The elastomer is a hydrophobic, water-insoluble elastic solid with low creep, typically made from such materials as polyvinyl chloride, copolymer of vinyl chloride and vinyl acetate, polyurethane, or polysulfide; often a plasticizer compatible therewith is employed to obtain the desired physical qualities.

---

This application is a continuation-in-part of application Ser. No. 612,547, filed Jan. 30, 1967, now abandoned, which was a continuation-in-part of application Ser. No. 488,166, filed Sept. 17, 1965, now abandoned.

This invention relates to an article comprising a film of water-washable tacky elastomer supported on a suitable rigid base.

We have made the unexpected discovery that certain tacky materials are water-washable, so that lint, hair, paper, dirt, and other substances collected by these materials may be easily washed off with soap and water, leaving the surface as clean and as tacky as ever. Such a material is useful as a lint remover, a bulletin board, an air filter, and so on.

Prior-art tacky adhesives have typically been very viscous liquids in which solid particles, once picked up, gradually become embedded until it becomes impossible to wash them from the adhesive. Some of the prior-art tacky adhesives have been water-soluble, at least enough so that it was impractical to wash them at all; others lost their tack when washed by soapy water. In any event, it has been substantially impossible to clean off the picked-up dirt, lint, hair, paper, and so on from these prior-art tacky adhesives, and when they were used to pick up these materials, they soon had to be discarded and replaced by new material.

An important object of our invention is to provide upon a suitable base a tacky surface that picks up dust, dirt, lint, hair, paper, and so on and can then be itself freed from this material by washing it with water, or soap and water, or water and detergent—even after the foreign matter has been on the tacky surface for days or weeks or months. A renewable surface is thereby obtained, and the surface can be used and cleaned and re-used repeatedly, time after time.

Other objects and advantages of the invention will appear from the detailed description which follows.

Briefly, the invention may be summarized as follows: a suitable base supports a water-washable, tacky elastomer having a modulus of from 1 to 100 p.s.i. and an internal viscosity of 1000 to 20,000 poises. The elastomer is a solid, is hydrophobic, and is insoluble in water. It may comprise any of many well-known elastomers meeting the basic qualifications and provided in the proper physical form, often with the aid of suitable plasticizers. In another method of testing the substances useful in this invention, the internal viscosity is expressed in minutes and is from 0.1 min. to 800 min.

In the drawings:

FIG. 1 is a greatly enlarged fragmentary sectional view of a portion of a roller supporting a tacky water-washable adhesive elastomer embodying the principles of this invention, shown in the act of picking up a particle of foreign matter such as a cat hair from a textile fabric, the elements being shown at the instant of contact.

FIG. 2 is a smilar view showing the attachment of the particle by the adhesive elastomer after the roller is withdrawn from contact with the fabric.

FIG. 3 is a similar view showing the application of soapy water to the surface, showing how the forces holding the adhesive to the particle are released, so that the particle can be washed off.

FIG. 4 is an enlarged view in side elevation and in section of a portion of an air filter embodying the principles of the invention.

Figure 5:
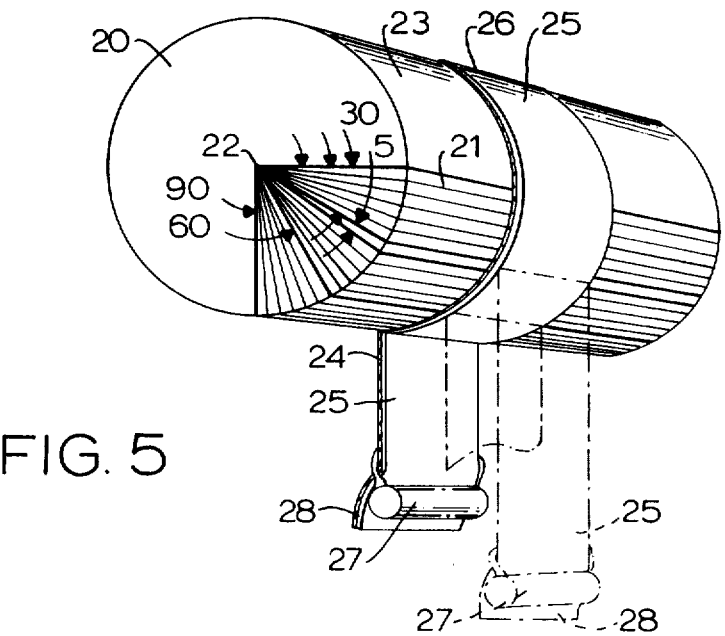
FIG. 5 is a view in perspective of a test apparatus comprising a polished steel cylinder with scribed lines, with an adhesive strip on test and shown in alternative positions.

FIG. 1 shows a portion of a sufficiently rigid roller body 10, tubular, metallic or other, carrying a thin coating 11 having a thickness of a few thousandths of an inch. The coating is a water-washable tacky elastomer embodying the principles of this invention, having a Young's modulus of about 1 to 100 pounds per square inch and an internal viscosity of 1000 to 20,000 poises; it is a true solid, is hydrophobic, and is insoluble in water.

When the roller 10 is rolled over the surface of an object 12 to be cleaned, such as a textile fabric, having a line or dirt particle 13 attached to the object 12, a slight pressure is exerted in the direction of arrow 14. The tacky elastomer 11, initially making only point contact with the dirt particle 13, flows, as indicated by arrows 15, to enlarge the surface contact. The yielding of the coating 11 results primarily from the softness of the material, since the modulus is within the stated range. The softness and pliability of the coating material 11 enable Van der Waals forces to pull the particle 13 and distort the coating 11 into a perfect fit with the particle's surface. As shown in FIG. 2, there is a powerful attraction between the contacting surfaces of the particle 13 and the coating 11, due to these Van der Waals forces. These forces are usually undetectable, since normally the actual contact area between two surfaces apparently in contact is vanishingly small, for instance $\frac{1}{1000}$ of 1%. When, however, the percentage of actual contact area becomes appreciable, then the Van der Waals forces are strongly in evidence, approaching the strengths of materials (which are, in fact, due to these same forces.) The internal viscosity of the coating 11, is, however, so great that the coating 11 only slowly and reluctantly changes from this perfectly fitting shape. The particle 13 does not sink into the coating 11 down to the interface between the coating 11 and the body 10, since the coating 11, though soft, is an elastic solid, not a liquid. As the object 12 (a textile web or the like) is rather suddenly removed, as in the case during roller action, the particle 13 though still having a tendnecy to cling to the object 12 does not follow the object 12 but remains adherent to the coating 11.

Subsequently, it becomes desirable to clean the coating 11, washing off the several dirt particles 13 so that the full surface again becomes available for re-use. Preferably, soapy water 16 having a sufficiently reduced surface tension is used. The extremely high dielectric characteristics of water (dielectric constant of about 80) immediately tend to neutralize the Van der Waals forces in an action which may be described as shorting them out. First, the water 16 attacks the adhesive bond at the edge of the contacting surfaces of the coating 11 and particles 13. Since the washing operation takes several seconds, there is plenty of time for the required change of shape to occur, and the internal viscosity of the coating 11, which was formerly helpful in picking up the particle 13, because the material 11 was almost undeformable in the very short time required to yank the particle 13 off the fabric 12, now has several seconds to reform to its original, generally smooth surface, and so the internal viscosity does not prevent the reforming. Hence, the water 16 at first neutralizes the Van de Waals forces at the edges of the particle 13, thereby loosening the bond between the particles 13 and the coating 11.

The resiliency of the coating 11 is of vital importance. Many tacky materials on the market, though they may show elasticity to a short-term stress, are not true solids, but are very viscous liquids. If particles are not washed off immediately from such materials, they slowly flow around the particles and imbed them, a slow continuation of the initial "wetting" action. Soon, it becomes virtually impossible to wash the particles off, and the utility of such a coating is destroyed if left dirty overnight.

However, the coating of this invention being a true solid, the particles do not sink into it. The coating 11 is deforming during the bonding state into a contour perfectly fitting a portion of the particle 13, due to operation of the Van der Waals forces, but the partial neutralizing of these forces by the soapy water enables resilient retraction of the coating 11. Hence, the coating 11 attempts to pull back into its original shape, to return to its original generally smooth glossy surface contour, as indicated in FIG. 3. This loosening of the bond and retraction of the adhesive coating 11 is progressive from the bond edge, in that it tends progressively to reduce the bonding surface area until the dirt particles 13 in effect are loosely seated on the surface of the coating 11 and can be rinsed away. This loosening of the bond is enhanced if the dirt particle is hydrophilic. As practically all lint and dust are either cotton or silicate mineral (both of which are hydrophilic), these particles 13 are easily wetted, so that the bond is additionally loosened by water 16 reaching and wetting the bond surface, facilitating and hastening the loosening of the bond. Hence, the time needed for washing the dirt 13 off the coating 11 is quite short. If the coating 11 is (as is preferable) hydrophobic, water and dirt run off together to render the coating 11 readily dry after washing, and the tool 10 having the coating 11 is reusable immediately thereafter.

From the preceding description, it is shown that the washable tacky elastomer used in this invention is a solid is elastic with elongation above about 50%, has a certain large internal viscosity, and yet is soft—i.e., has a certain very low modulus of elasticity.

The physical properties control the selection of useful substances, rather than their precise chemical composition; and the essential physical properties or characteristics are defined herein in clear terms by which one skilled in the art can readily select the substances or materials to be incorporated in the article of this invention.

Certain other characteristics are highly desirable for most applications. If the composition is hydrophobic or water-repellent, washing is facilitated. When clean, the water will run off as from a waxed surface, leaving the surface dry.

Experience has shown that the softness of the tacky material used in this invention can range from a modulus as low as 1, at which point the material is dangerously weak, to a modulus as high as 100. Values in the upper part of the range are satisfactory only with materials with a high "intrinsic adhesivity," i.e., a high surface free energy, a property to be discussed later, and, when high, not desirable in a lint pick-up device. In general, the softer, i.e., the lower the modulus, the greater the tack. Some materials, such as some polyvinyl chloride compositions, have a quite non-linear stress-strain curve. The first portion of the curve shows a very low modulus, but later the curve becomes very steep, indicating a very high modulus. In such material, one can get the benefit of great softness with relatively high toughness, and a modulus of 10 gives very good results.

Another requirement for washable tackiness which is particularly significant in such uses as lint removal, is an internal viscosity between aabout 1000 and 20,000 poises, or in the order of $10^3$ to $2 \times 10^4$ poises.

Internal viscosity in a solid may be a new concept to some people, and an example may help; a vinyl garden hose has a high internal viscosity, while gum rubber has a low internal viscosity. Even though it may be "harder," a gum rubber tube suffers no harm from being run over by a car, while a vinyl garden hose (especially if old and cold) can be cracked to pieces by the same treatment, because it cannot deform quickly enough, due to its higher internal viscosity. If the rubber tube be heavy, it may require more weight to flatten it than to flatten the vinyl hose; moreover, the rubber flattens partway immediately and stays there, while the vinyl slowly flattens out completely. Hence, the vinyl is considered "softer" because it flattens out further, but is slow to do so, because it has a higher internal viscosity.

As will be seen, most elastomers require a plasticizer to achieve a modulus as low as is desired. Materials such as neoprene and high-molecular-weight vinyls have little internal viscosity of their own, and the viscosity of the plastized material is a fairly accurate reflection of the viscosity of the plasticizer itself. In any event, the internal viscosity must be low enough so that the material can quickly flow into large surface contact with the surface of the object to which tack is sought. But the viscosity must also be high enough so that the material does not yield too quickly to any force seeking to remove the object tacked onto the adhesivee. Too low a viscosity results in little apparent tack, and the material lets go of the lint particles too easily and quickly. On the other hand, too high a viscosity results in the material feeling tacky with sustained contact pressure but not flowing quickly enough into large surface contact with the particle 13 for most uses, which involve very short-time contact pressure. Experience has shown that a viscosity in the neighborhood of 2,500 to 5000 poises is desirable for lint pick-up devices. In general, viscosities outside the range of from 1,000 to 20,000 poises give inferior results.

Measuring the internal viscosity of a solid in poises is not easy. In the case of highly plasticized vinyls or neoprene, measurement is unnecessary, for the plasticizer used therewith determines the resultant viscosity, and the manufacturer often furnishes this figure. Materials such as polysulfides, which have a high internal viscosity of their own, or polyurethanes, wherein no plasticizer need be used, present more of a problem.

One method is to compare them with a vinyl material whose viscosity is known from its plasticizer: A ball of the material in question is prepared, and a similar ball is prepared of the same modulus in a mixture of a high-molecular weight polyvinyl chloride, such as Geon 121 with a plasticizer whose internal viscosity is known. The surfaces are dusted with talc or a similar powder, and the rebounds are compared, the greater the rebound, the lower the viscosity. This method is crude but effective so long as care is taken to make the modulus, an easily measured property, of the two balls equal. A better method is described below.

Tack is the result of a particular degree of softness and internal viscosity in combination with a property which might be termed the "intrinsic adhesivity," but which is better known as "surface free energy," the degree to which the Van der Waals forces within the material are bound. For example, in materials such as waxes or polytetrafluoroethylene, or (in general) materials composed of long unbranched chain molecules, the molecular bonds are tightly bound and show little of this quasi-chemical activity at the surface, and can be described as having a low intrinsic adhesivity. On the other hand, materials composed of short chain or highly branched chain molecules have many chain ends on any given surface, and thus have a high degree of quasi-chemical activity at the surface; these can be described as having a high intrinsic adhesivity. When compounding or choosing a washable tacky elastomer for a given application, the proper choice of characteristics as taught herein can be used to a great advantage. For instance, when extreme ease of washability is desired, as in a roller lint pick-up device, a material such as a very high molecular weight polyvinyl chloride can be used as a base resin. This because of its low surface free energy and high elasticity will wash clean very easily, while the application of the principles taught herein regarding modulus and internal viscosity will give an aggressive tack even though the base resin has a low intrinsic adhesivity, by the addition of a suitable plasticizer. This is a very particular advantage, as shown by the discussion on the mechanism of washability.

The internal viscosity of a solid is difficult to measure in terms of poises, and surface free energy is so difficult to measure in terms of ergs per square centimeter as to be impractical, and we have devised a simple empirical test which measures these properties in arbitrary units.

(A) FIG. 5 shows a polished steel cylinder 20, two inches in diameter, scribed with fine lines 21 parallel to the axis 22 and 5° apart over 90° of its surface 23. The cylinder 20 is mounted firmly in cantilever with the axis horizontal, in the position shown in FIG. 4. A one mil film of adhesive 24 is cast on a polyester terephthalate (mylar) strip 25 of one mil thickness, which is then trimmed to a width of one inch. The cylinder 20 is washed carefully with methyl ethyl ketone, and the strip 25 is placed over the scribed lines 21 nd one end 26 draped over the top. The strip 25 is pressed firmly against the cylinder 20 to attain as near as possible 100% contact area. A 100-gram weight 27 is hung gently on the trailing end 28 and the time noted at the 90° position. The progress of the peel line is noted from time to time. The total time allowed must be ample to ascertain that the peel line has in fact stopped moving, to insure that internal viscosity is not affecting the result. Twenty-four hours is suggested as a convenient period; if the line is still moving, the formulation may be discarded as having too high an internal viscosity for a lint pick-up device.

Figure 6:
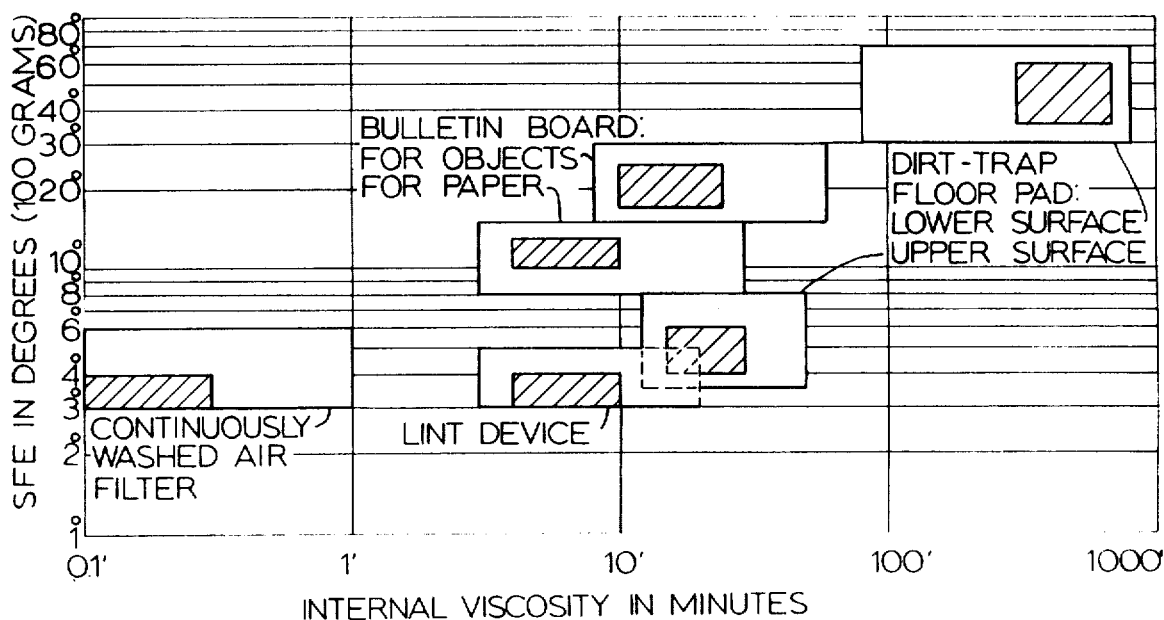
FIG. 6 is a chart showing the ranges of surface free energy or intrinsic adhesivity values expressed in degrees as will be explained and of internal viscosity in minutes, which also will be explained, which are useful and preferred in carrying out certain embodiments of this invention.

From this test, three things can be learned:

(1) The stopping position of the peel line is a measure of the permanent tack of the adhesive in question, also described above as surface free energy (SFE), or intrinsic adhesivity. As shown in FIG. 6 for a range of specific use and articles this property runs from about 3° to above 70° measured as described. Thus, for an air filter device the surface free energy is from 3° to 6°, preferably 3° to 4°; for removably adhering paper to a bulletin board, is from 8° to 15°, preferably 10° to 13°, and for objects so adhered, 15° to 30°, preferably 17° to 25°; for a floor pad upper surface to entrap dirt particles from shoes or objects passing in contact with it, 3.5° to 8°, preferably 4° to 6°, and for its lower surface removably adhered to the floor, from 30° to 70°, preferably 35° to 60°; while for a lint collector as more particularly described in this application, this value is from 3° to 5°, preferably 3° to 4°.

Every failure of a pressure-sensitive adhesive occurs in one or both of two ways: slide or peel. Sliding, or shearing, is prevented by the use, as taught by this patent, of resilient solids instead of viscous liquids.

This reduces all failures (at any normal loading) to peel failures. The lower the modulus, in other words the softer the adhesive mass, the greater the area over which the peel load is spread. The scribed-cylinder test automatically includes this effect, and this of course enhances the value of the test. In general, the modulus should be kept as low as is compatible with the severity of abrasion or load of the usage intended, since the higher the modulus, the less deformable and "form-fitting" and therefore less effective the pressure-sensitive adhesive becomes.

(2) The length of time from start to within 5° of finish (the finish is surprisingly definite) is a measure of the internal viscosity. As can be seen from FIG. 6, this time for a range of utilities is specifically from about 0.1 minute or 6 seconds for an air filter over which air flows relatively rapidly, to about 800 minutes for the lower surface of a dirt-entrapping, removably adhered floor pad; and a useful overall range of such time is from 0.1 minute to 800 minutes. For specific articles and uses certain ranges are desirable. Thus, in the air filter the time is from 0.1 to 1 minute, preferably 0.1 to 0.3 minute; for the bulletin board mentioned above, paper adherence adhesive time is from 3 min. to 30 min., preferably 4 min. to 10 min., and for objects, 8 min. to 60 min., preferably 10 min. to 25 min.; for the dirt-entrapping floor pad mentioned above, upper surface, 12 min. to 50 min., preferably 15 min. to 30 min., and lower surface, 80 min. to 800 min., preferably 300 min. to 700 min.; while for the lint collector, the time is 3 min. to 20 min., preferably 4 min. to 10 min.

The lower the modulus, the greater the deformation effected by any given deforming force, and thus the greater the distance through which viscous forces will act. Thus the viscous effect is increased by lowering the modulus. The scribed-cylinder test automatically includes this effect, which of course enhances the value of the test.

Obviously, no direct conversion from minutes to poises is possible. However, it may be of interest to note that three vinyl adhesive masses, very similar except for viscosity, gave the following results:

2200 poises: 0.5 min.
5000 poises: 4.5 min.
9100 poises: 18.0 min.

(3) If the creep is too high in an otherwise satisfactory adhesive, the adhesion will be greater than the cohesion, and a residue will be left on the cylinder 60. This adhesive cannot be considered washable; lint and dust and paper fibres will embed in it and soon make it unusable.

In the arbitrary units of this test, the second vinyl composition mentioned later was found to have an internal viscosity of 8 minutes and a free surface energy of 3°. This was the lowest value of surface free energy of any of these compositions, and contributes to its extreme ease of washability. Obviously, for lint pick-up devices, the lower the surface free energy the better. In general, viscosities below three minutes or above twenty minutes give inferior results.

If a plasticizer is used, it is of course important that it be highly compatible and not subject to excessive "sweating." It is obviously important that the plasticizer be highly resistant to extraction by soapy water, since, otherwise, successive washings would soon destroy the efficacy of the material. The plasticizer should not be fugitive, i.e., it should have an extremely low vapor pressure, e.g., below $10^{-8}$ microns Hg. When used, the plasticizer imparts to the final product a desired value of internal viscosity and softness not inherent in those elastomers with which the plasticizer is used. If a copolymer of vinyl chloride and vinyl acetate is used, somewhat less plasticizer is preferred.

Almost any any non-water-soluble elastomer will give satisfactory results if formulated according to the teachings of this patent. While not in any sense to be construed as a comprehensive survey of the field, the following comments may be helpful, and the following compositions which spread over a fairly wide range of elastomers may be found to be useful starting points for those versed in the art of plastic and rubber compounding. The high-molecular weight vinyl chloride plastics have the advantages of low cost, ease of handling, transparency, low surface free energy, and a non-linear stress-strain curve lends toughness. The polyurethane composition has the virtues of transparency and in using no plasticizer whatever so that "sweating" and "marring" are impossible. The neoprene has a high elongation lending some toughness.

EXAMPLE 1

A water-washable tacky adhesive for use in a lint-removing roller

Ingredient: Parts by weight
High-molecular-weight polyvinyl chloride, e.g., Geon 121 made by B. F. Goodrich _____ 100
Plasticizer, a polyester condensation product of sebacic acid and ethylene glycol of approximately 8000 molecular weight, e.g. Paraplex G25 made by Rohm and Haas _____ 400
Barium zinc phenate, e.g., Argus Chemical Co., Mark KCB _____ 4

Suitable pigment or dye, if desired, may be added. The suggested cure cycle is 10 min. at 380° F.

This composition has an internal viscosity of 2200 poises, a Young's modulus of about 10 p.s.i., and a permanent tack angle of 3°.

Similar results may be obtained by substituting a copolymer of polyvinyl chloride and polyvinyl acetate for the polyvinyl chloride, the copolymer preferably having approximately the same physical qualities as that of this example and usually requiring slightly less plasticizer.

EXAMPLE 2

A water-washable tacky adhesive for use in a lint-removing roller

Ingredient: Parts by weight
High-molecular-weight polyvinyl chloride, e.g., Geon 121 made by B. F. Goodrich _____ 100
Plasticizer, a polyester condensation product of sebacic acid and ethylene glycol of approximately 8000 molecular weight, e.g., Paraplex G25 made by Rohm and Haas _____ 400
A glycerol ester of hydrogenated rosin, e.g., Staybelite Ester 10 made by Hercules, Inc. __ 100
Barium zinc phenate, e.g., Argus Chemical Co., Mark KCB _____ 4

Suitable pigment or dye, if desired, may be added. The suggested cure cycle is 10 min. at 380° F.

This composition has an internal viscosity of about 8 minutes, a Young's modulus of about 10 p.s.i., and a surface free energy of abotu 3°, according to the test described above.

EXAMPLE 3

A bulletin-board tacky elastomer

For uses other than a lint pick-up device, those skilled in the art of rubber and plastic compounding will appropriately modify the composition being used, adjusting the physical properties, within the ranges described, in keeping with the desired end use. For example, for a bulletin board where it is desired to post notices or other light objects without the necessity of recourse to thumb-tacks, push-pins, magnets, etc., another consideration arises. The original deforming force (one's thumb slid along the top edge) is removed. And yet the tackiness is required to support the paper or other object indefinitely against the sustained force of its weight or tendency to curl. Here, the internal viscosity is no help, and an increase in the "intrinsic adhesivity" or surface free energy is indicated. An example of an effective method of accomplishing this is to modify the vinyl formulation of Example 1 by the replacement of 20% of the Geon 121 polyvinyl chloride by Geon 222, which is a very short chain polyvinyl chloride copolymer of high intrinsic adhesivity. In the resulting composition, the initial contact pressure is relatively sustained. Bulletins would successfully adhere to the bulletin board even though the composition used were to have an unusually high internal viscosity; however, this would make the removal of a bulletin from the board unnecessarily time-consuming, and it is still best to stay within the quoted range of viscosity.

EXAMPLE 4

Dust remover for phonograph records or air filter

To make a dust remover for phonograph records, or a washable air filter, the material should be very soft with a mild tack. The desired change of properties in relation to the basic vinyl composition of Example 1 may be obtained by adding, for example, 100 parts by weight of butyl benzyl phthalate, sold under the designation Santicizer 160 by Monsanto Chemical Co. A pigment may be added in the proportion of as much as 30 parts by weight per 100 parts by weight of polyvinyl chloride for the phonograph record cleaner, but the pigment may be omitted for the filter. Here, the plasticizer is a mixture of two plasticizers, enabling the desired specific final result. Specifically, the internal viscosity is reduced to about 1000 poises, or 8 seconds by the test described above, so that the tack is very mild, and the modulus has been reduced.

As shown in FIG. 4, strands of a suitable material such as fiber glass, wire, etc., may be used in a suitable regular or irregular assembly for an air filter. FIG. 4 shows schematically a web, composed of thin strands 20 covered with a coating 11 of a water-washable elastomer in accordance with the present invention.

EXAMPLE 5

Polyurethane-type water-washable tacky composition

Two components are used:

Component A

Ingredient: Parts by weight
Polyether triol, e.g., Wyandotte TP 4542 _____ 100
Toluene di-isocyanate, e.g., Allied Chemical, Nacconate _____ 12

The mixture is held at 160° F. for 4 hours.

Component B

Ingredient: Parts by weight
Polyether triol as in Component A _____ 100
Tin octoate catalyst, e.g., Witco Chemical Co. tin catalyst C-4 _____ 0.5

The two prepared components are mixed in the proportions, by weight, of
Component A _____ 100
Component B _____ 83

Cure 4 hours at 180° F.

EXAMPLE 6

Polysulfide type of water-washable tacky material

Ingredient:  Parts by weight (A) Resin component

| | |
|---|---|
| Polyalkylene polysulfide, e.g., Thiokol LP 31 | 100 |
| Chlorinated biphenyl, e.g., Monsanto Arocolor 1254 | 90 |
| Calcium carbonate, e.g., Diamond Alkali Co. Super Multifex | 30 |
| Liquid coumarin-indene alkylated phenol, e.g., Neville Chemical Co. 10° Nevillac | 20 |
| Bis-phenol-A and epichlorhydrin epoxy resin, e.g., Shell Chemical Epon 836 | 3 |
| Stearic acid | 0.5 |
| Sulfur | 0.1 |

(B) Catalyst component

| | |
|---|---|
| Lead oxide | 100 |
| Chlorinated biphenyl, e.g., Monsanto Aroclor 1254 | 30 |
| Xylene | 10 |
| Zinc stearate | 2.5 |
| Stearic acid | 1.5 |

Then two components are mixed in the preferred ratio of one hundred parts by weight of the resin mix to three and one-half parts of catalyst mix and cured at 160° F. for two hours.

EXAMPLE 7

Neoprene type of water-washable tacky material

Rubber solution:  Parts by weight

| | |
|---|---|
| Polychloroprene, e.g., Du Pont Neoprene W | 100 |
| Toluene | 240 |
| Methyl ethyl ketone | 160 |

The mixture is stirred or tumbled until the neoprene is dissolved.

Premix of catalyst, plasticizers, etc.

| | |
|---|---|
| Chlorinated biphenyl, e.g., Monsanto Aroclor 1254 | 20 |
| Zinc oxide | 10 |
| Magnesium oxide | 5 |
| Phenyl-beta-naphthylamine, e.g., Du Pont Neozone D | 2 |
| Ethyl thiourea, e.g., Du Pont Accelerator NA 22 | 1 |

The materials are dispersed in the Aroclor, and then the following materials are added and mixed:

Parts by weight

| | |
|---|---|
| Monsanto Aroclor 1254 | 55 |
| Neville Chem. Co. 10° Nevillac | 25 |

The premix is added to the rubber solution and mixed. After it is thoroughly dry, cure for 30 minutes at 250° F.

Whatever the composition, when it is used as a tacky coating for picking up foreign matter, it is preferable that the thickness lie in the order of 0.005 inch. Little is to be gained by a thickness greater than about 0.01 inch, and at a thickness below about 0.002 inch the results are generally less satisfactory.

We claim:

1. An article for releasably picking up solid particles comprising a rigid base member and as a coating on said member a water-washable tacky solid comprising an elastomeric composition having a modulus of elasticity low enough to enable deformation by dust and lint particles and high enough and with low enough creep to assure restoration to original shape after washing and to prevent the dust and lint particles from settling down into it, and having an internal viscosity low enough to enable water-washing and high enough to provide tack, said modulus being from about 1 to about 100 p.s.i. and said viscosity being from about 0.1 min. to about 800 min.

2. The article of claim 1 wherein said elastomeric composition is hydrophobic.

3. The article of claim 1 wherein said elastomer composition comprises a mixture of high-molecular polyvinyl chloride and a polyester plasticizer in the ratio of about 1:4 by weight.

4. A lint collector, including in combination:
a rigid base member and a water-washable, tacky coating on said member having a Young's modulus between 1 and 100 p.s.i. and an internal viscosity in the order of from 3 to 20 minutes.

5. The lint collector of claim 4 wherein said internal viscosity is from about 4 min. to about 10 min.

6. The lint collector of claim 4 wherein said tacky coating has a modulus of elasticity low enough to enable deformation by dust and lint particles and high enough to assure restoration to original shape after washing and to prevent the dust and lint particles from settling down into it, and has an internal viscosity low enough to enable water washing and high enough to provide tack.

References Cited

UNITED STATES PATENTS

| | | | |
|---|---|---|---|
| 2,955,962 | 10/1960 | Engdahl | 117—122 X |
| 3,342,325 | 9/1967 | Dreher | 117—122 X |
| 3,208,093 | 9/1965 | Hansen | 117—122 |
| 3,091,597 | 5/1963 | Henriques | 117—122 X |
| 1,902,024 | 3/1933 | Gerlach et al. | 117—122 X |
| 2,431,745 | 12/1947 | Flanagan | 117—161 X |
| 2,662,033 | 12/1953 | Andrew | 117—161 X |
| 3,167,524 | 1/1965 | Lauck | 117—161 |
| 3,192,548 | 7/1965 | Wilbrecht | 117—122 |
| 3,201,815 | 8/1965 | Selby | 117—122 |
| 2,887,403 | 5/1959 | Wolff | 117—122 X |
| 3,354,237 | 11/1967 | Shaw | 260—829 |
| 3,412,061 | 11/1968 | Drukker | 260—829 |
| 2,036,009 | 3/1936 | Wright | 260—873 |

FOREIGN PATENTS

| | | | |
|---|---|---|---|
| 624,393 | 6/1949 | Great Britain | 117—161 |
| 639,866 | 7/1950 | Great Britain | 117—161 |
| 734,664 | 8/1955 | Great Britain | 117—161 |
| 750,190 | 6/1956 | Great Britain | 117—161 |
| 884,604 | 12/1961 | Great Britain | 117—161 |
| 645,739 | 7/1962 | Canada | 117—161 |

OTHER REFERENCES

Buttrey: Plasticizers; Franklin Publishing Co. Inc., 1960, pp. 150–152.

Rubber World: Materials and Compounding Ingredients for Rubber and Plastics; 1965, p. 205.

WILLIAM D. MARTIN, Primary Examiner

M. R. P. PERRONE, Jr., Assistant Examiner

U.S. Cl. X.R.

15—104A; 117—122 PA, 122 R, 161 UC, 161 UF, 161 UT, 161 UH; 134—10; 260—829, 858, 873